J. F. HOLMES.
Improvement in Rotary Washing and Scouring Machines.
No. 123,019.  Fig. 1.  Patented Jan. 23, 1872.
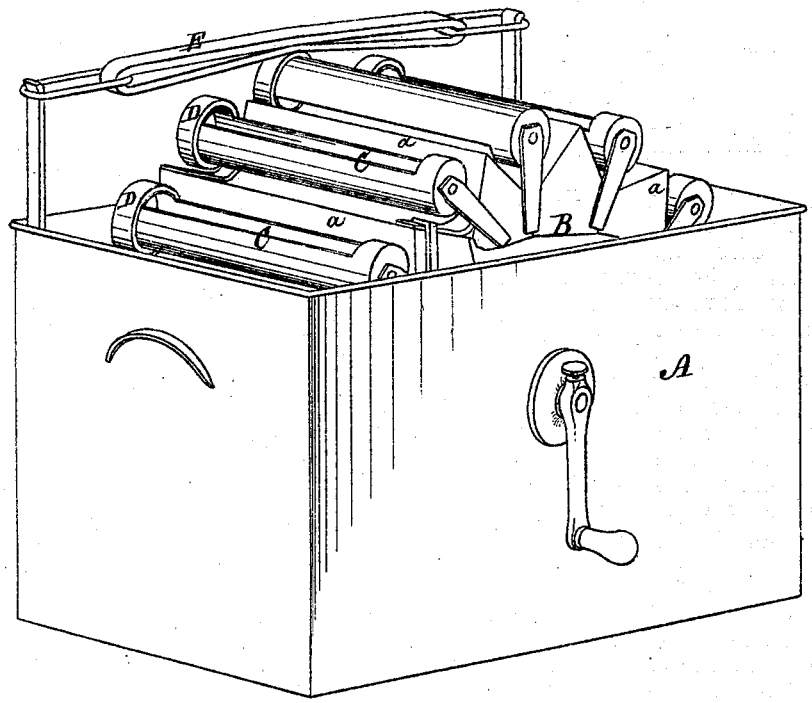
Fig. 2.
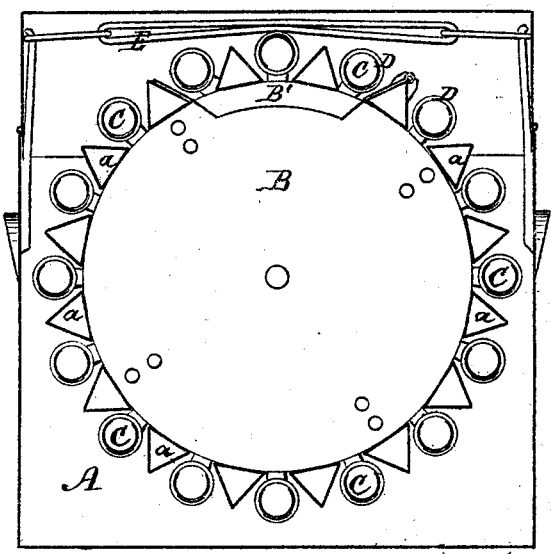
Witnesses
Phil. R. Larner
Edmund Masson.
Inventor
Jason F. Holmes
By Wm Elwood
Attorney 123,019

UNITED STATES PATENT OFFICE.

JASON F. HOLMES, OF PROVIDENCE, RHODE ISLAND.

IMPROVEMENT IN ROTARY WASHING AND SCOURING MACHINES.

Specification forming part of Letters Patent No. 123,019, dated January 23, 1872.

*To all whom it may concern:*

Be it known that I, JASON F. HOLMES, of the city and county of Providence and State of Rhode Island, have invented certain new and useful Improvements in Rotary Washing and Scouring Machines.

My invention relates to that general class of washing-machines which consist of a water-receptacle and one or more vertical revolving cylinders, within which the goods to be cleansed are deposited; and it consists in a novel means for continually conveying water from below the cylinder to its upper periphery and automatically discharging it downward into the interior of the cylinder, thereby continually drenching and rinsing the articles therein contained; and I do hereby declare that the following specification, taken in connection with the drawing furnished and forming a part of the same, is a clear, true, and exact description of a rotary washing-machine embodying my improvement.

Figure 1 of the drawing represents one of my machines in perspective. Fig. 2 represents the same in cross vertical section.

A represents the tank or reservoir within which the wash-water is deposited. It may be made of any suitable material, and should, of course, be water-tight. It may be mounted on a bench, flat-bottomed, or provided with a projecting chamber fitted to enter openings in the top of a range or stove, or in the case of bleacheries it may be built up of wood and connected with steam-boilers by pipes in the usual manner. A suitable cover should be provided in order to retain the heat as much as possible, as the process of washing or scouring will thereby be much more easily effected. B represents a vertically-revolving cylinder mounted upon horizontal studs, which protrude through the sides of the tank A, to one of which a crank or other equivalent device may be attached. The ends of this cylinder in the present instance are represented as closed, although they may be with propriety provided with openings to admit of the free passage of water in and out. It is provided with a hinged door, B', which affords free access to the interior when desired. C in each instance represents one of numerous buckets, which are provided with axle-pivots at each end, and which are mounted upon suitable arms extending radially from the ends of the cylinder. These buckets may be made semi-cylindrical, rectangular, with square sides and flat bottom, or in any other desired form, provided that each when mounted upon its axis shall be so balanced that the open mouth or top of the bucket will always remain uppermost and level, except when it is caused to rotate upon its axis. In the present instance they are exhibited as if semi-cylindrical in form and extending across the face of the cylinder from end to end. Being made of tin and very light, they are in this instance weighted at the bottom, which causes them to naturally maintain a vertical position, whether full of water or empty, during the entire revolution of the cylinder. Each of the buckets, at one end, is provided with an annular bearing-surface, D, the center of which is the bucket-axis. E in this instance represents a stationary bearing-surface, composed of a double strip of vulcanized elastic gum supported by and between two posts projecting upward from each end of the tank. The bearing-surfaces D (also in this instance of vulcanized gum) and the stationary surface E are placed upon the same line, so that when the main cylinder revolves the bearing-surface D on every bucket will be brought into contact with the stationary surface E, and by this contact each bucket will be caused to make one complete revolution during the time the two bearing-surfaces are in contact. Between the buckets are shelving plates a, which serve the treble purpose of strengthening the cylinder, causing the water as it is poured from the bucket to be directed into the cylinder, and also preventing the goods within the cylinder from getting in contact with the buckets. Other braces are employed within, which, while they serve as such, also prevent the goods from getting matted.

It will be readily obvious that the continued revolution of the main cylinder will cause the several buckets to be successively filled while passing through the water below in the tank and emptied when at their highest elevation into the interior of the cylinder.

It is evident that a great variety of methods may be employed for effecting such movement of the buckets as will secure the delivery of water therefrom, and I have particularly described but one simple and desirable arrangement. A series of gears and a rack-gear occupying the relative positions of the bearing-surfaces D and E would, of course, accomplish a similar purpose. It is not absolutely essential that the buckets be made to accomplish a complete revolution on their axes so long as the movement thereon be sufficient to accomplish the discharge of their contents at the proper point, and as this can be accomplished in a great variety of methods it is only necessary to suggest that the buckets while in motion be brought into contact with any fixed or stationary object set with proper relation to the line of buckets.

The buckets are operated by the revolution of the cylinder in either direction, which admits of the frequent reversal of its movement in order to more effectually prevent the goods within the cylinder from being clogged and matted.

Having thus described my invention, I claim as new and desire to secure by Letters Patent—

1. The series of pivoted buckets mounted at or near the periphery of a revolving cylindrical or drum-like structure and arranged to alternately maintain a vertical and an inverted position and discharge their contents into the interior of the cylinder, substantially as and for the purpose specified.

2. The combination of a water-tank, a revolving cylinder, and a series of pivoted buckets, mounted at the periphery of the cylinder and arranged to elevate water from the bottom of the tank and discharge it downward into the interior of the cylinder, as and for the purposes specified.

3. The combination of the pivoted buckets, the stationary bearing-surface, the shelving plates a, and the revolving cylinder, substantially as and for the purposes specified.

JASON F. HOLMES.

Witnesses:
J. W. MARTIN,
CHARLES SELDEN.